United States Patent [19]

Chang

[11] Patent Number: 5,373,084
[45] Date of Patent: Dec. 13, 1994

[54] THERMOSETTING POWDER COATING COMPOSITIONS

[75] Inventor: Yeong-Ho Chang, Kingsport, Tenn.

[73] Assignee: Eastman Chemical Company, Kingsport, Tenn.

[21] Appl. No.: 231,343

[22] Filed: Apr. 21, 1994

Related U.S. Application Data

[63] Continuation of Ser. No. 918,723, Jul. 21, 1992, abandoned.

[51] Int. Cl.$^5$ ............................................. C08G 63/02
[52] U.S. Cl. .................................... 528/272; 528/296; 528/503; 525/437; 525/440; 525/442; 525/443; 525/444; 525/449
[58] Field of Search ................ 528/272, 296, 503; 252/437, 440, 444, 449, 442, 443

[56] References Cited

U.S. PATENT DOCUMENTS

| | | | |
|---|---|---|---|
| 3,821,150 | 6/1974 | Blackley et al. | 260/31.6 |
| 4,387,214 | 6/1983 | Passmore et al. | 528/296 |
| 4,442,270 | 4/1984 | Passmore et al. | 525/440 |
| 4,481,351 | 11/1984 | McConnell et al. | 528/272 |
| 4,859,760 | 8/1989 | Light, Jr. et al. | 528/45 |
| 4,910,292 | 3/1990 | Blount | 528/272 |
| 4,937,288 | 6/1990 | Pettit, Jr. et al. | 525/176 |
| 4,988,767 | 1/1991 | Pettit, Jr. | 525/194 |
| 4,990,593 | 2/1991 | Blount | 528/272 |

FOREIGN PATENT DOCUMENTS

| | | |
|---|---|---|
| 0322827 | 7/1989 | European Pat. Off. |
| 89/05320 | 6/1989 | WIPO |
| 91/14745 | 10/1991 | WIPO |

*Primary Examiner*—Samuel A. Acquah
*Attorney, Agent, or Firm*—Bernard J. Graves, Jr.

[57] ABSTRACT

Provided are crosslinkable semicrystalline polyester plasticizers useful in thermosetting powder coating compositions. The plasticizers of the present invention are preferably comprised of residues of 1,6-hexanediol and 1,12-dodecanedioic acid, and optionally, residues of trifunctional acids or polyols such as trimethylol-propane, glycerol, trimellitic acid, and the like. The thermosetting powder coating compositions also provided by the present invention exhibit markedly superior properties when compared to compositions lacking said plasticizer. Such coatings exhibit better smoothness, less orange peel, better impact strength and flexibility. In the case of the less-reactive crosslinker such as self-blocked isophorone isocyanate (IPDI), the plasticizers greatly improve the reactivity of the composition and reduce the cure requirement.

3 Claims, No Drawings

THERMOSETTING POWDER COATING COMPOSITIONS

This is a continuation of copending application Ser. No. 07/918,723 filed on Jul. 21, 1992, which is now abandoned.

FIELD OF THE INVENTION

This invention belongs to the field of organic chemistry. More particularly, this invention relates to thermosetting powder coating compositions which contain certain plasticizer materials which improve the resulting coating's appearance without sacrificing the composition's storage stability.

BACKGROUND OF THE INVENTION

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures. However, the curing of thermosetting coatings has created problems in obtaining coatings which have, in addition to the above-stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. Such a coating surface or finish lacks the gloss and luster of coatings typically obtained from thermoplastic compositions. The "orange peel" surface problem has caused thermosetting coatings to be applied from organic solvent systems which are inherently undesirable because of the environmental and safety problems that may be occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

In addition to exhibiting good gloss, impact strength and resistance to solvents and chemicals, coatings derived from thermosetting coating compositions must possess good to excellent flexibility. For example, good flexibility is essential for powder coating compositions used to coat sheet (coil) steel which is destined to be formed or shaped into articles used in the manufacture of various household appliances and automobiles wherein the sheet metal is flexed or bent at various angles.

The concept of plasticizers in the plastics industry is well-known. Plasticizers are generally used to improve the melt flow during the extrusion and to modify the properties of the resulting plastic. In powder coating applications, plasticizers have been found to improve melt flow and thus improve appearance of the coating but they also lower the powder stability which is essential for a powder coating composition. Plasticizers are also known to migrate (i.e., "bloom") to the surface of the coating thereby causing a milky temporary thin film. Thus, caking resulting from storage instability and the blooming phenomenon limits the usefulness of known plasticizers in powder coating compositions.

Thus, the main objective of the invention is to provide such a plasticized thermosetting powder coating for improved overall appearance, better smoothness and gloss, less orange peel and better coating flexibility. A further objective of the invention is to accomplish improved properties without reducing powder stability. A further objective is the improvement in cure response of coating compositions through the use of a reactive plasticizer, particularly in the case of coating compositions based on less reactive crosslinking agents.

U.S. Pat. No. 4,988,767 describes a powder coating composition based on Beta-hydroxylalkyl amide curing agent and a first acid group containing acrylic polymer having a Tg of $-20°$ to $30°$ C. and a second acid-group containing acrylic polymer having a Tg of $40°$ to $100°$ C. to form a crosslinked product.

U.S. Pat. No. 4,937,288 describes a thermo-setting powder coating composition which comprises a carboxylic group containing acrylic polymer having a Tg of $35°-100°$ C. and carboxylic acid group containing polyester which is crystalline under $50°$ C. together with a Beta-hydroxylalkylamide curing agent. Preferred acids are dodecanoic acid, polymeric polyanhydride or low molecular weight polyesters with acid number of 75–375 and preferred melting point of $70°$ to $110°$ C.

U.S. Pat. No. 4,859,760 describes a powder coating composition containing an amorphous/semi-crystalline hydroxyl polyesters, compounded with diisocyanate crosslinkers to produce powder coatings with good balance of flexibility and hardness.

U.S. Pat. Nos. 4,442,270 and 4,387,214 describe a semi-crystalline copolyesters derived from terephthalic acid and 1,6-hexanediol or its variation for use in primers or overcoatings for automobiles.

SUMMARY OF THE INVENTION

The present invention provides semicrystalline polyester plasticizers useful in thermosetting powder coating compositions. The plasticizers of the present invention are preferably comprised of residues of 1,6-hexanediol and 1,12-dodecanedioic acid, and optionally, residues of trifunctional acids or polyols such as trimethylolpropane, glycerol, trimellitic acid, and the like. The thermosetting powder coating compositions also provided by the present invention exhibit markedly superior properties when compared to compositions lacking said plasticizer. In particular, the thermo-setting powder coating compositions of the present invention show superior cure profiles—i.e., in the extent of cure (or crosslink density) at a given temperature. For example, the coating of Example 2 below showed an MEK rub resistance far superior to that of Comparative Example 3.

DETAILED DESCRIPTION OF THE INVENTION

This invention relates to thermosetting powder coating compositions which upon application to a substrate and subsequent cure exhibit markedly superior properties, e.g., flexibility, appearance, and curing properties. Specifically, this invention relates to reactive plasticizers which are useful in powder coating compositions to improve smoothness, gloss, while reducing orange peel without affecting the powder storage stability. Moreover, the presence of the plasticizer of the present invention unexpectedly improves the cure of the coating, especially where a less-reactive crosslinker is employed.

The plasticizers of the present invention are highly crystalline, functionalized polyesters based on linear diacids, linear diols, and optionally a branching agent. The preferred diacids are linear aliphatic compounds of the formula $HOOC-(CH_2)_n-COOH$ where n=2 to 20 and the preferred diols are linear aliphatic diols of the formula $HO-(CH_2)_n-OH$ where n=2 to 20. Branching agents such as trimethylolpropane, trimellitic acid or other triacids or triols can also be incorporated as desired to produce desired functionalities for crosslinking. The plasticizer must have a melting point of from 40 to 200° C., preferably 60° to 150° C., a heat of fusion of 12–50 cal/g, preferably 20–35 cal/g, and an ICI melt viscosity at 200° C. of 0.5 to 20 poise, preferably 1–5 poise. The plasticizers must also have hydroxyl number or acid number of about 20 to 120, preferably from about 30 to about 80, thus providing suitable functionality for crosslinking. In other words, the plasticizer can be either carboxyl-functional or hydroxyl-functional, depending on the desired resin/crosslinker combination to be used in the coating composition.

Preferably, the coating composition is based on a crosslinker capable of reacting with carboxyl resins such as a hydroxyalkyl amide. Preferred hydroxyalkyl amides are of the formula

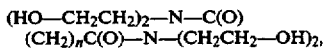

wherein n is an integer of 1 to 4. Especially preferred crosslinkers are bis(N,N-dihydroxyeth-yl)adipamide, promoted by Rohm and Haas as PRIMID XL 552, triglycidylisocyanate, or an epoxy resin. Alternatively, the coating may be based on a blocked isocyanate crosslinker capable of reacting with a hydroxyl resin, e.g., crosslinkers such as caprolactam-blocked isophoronediisocyanate, sold by Huls as B1530, self-blocked isophoronediisocyanate like adduct of 1,3-diazetdine-2,4-dione dimer of isophorone diisocyanate sold by Huls as BF1540.

Alternatively, the crosslinking agent may be a glycouril type. In general, such crosslinking agents possess a plurality of $-N-CH_2OR$ groups with $R=C_1-C_8$ alkyl, such as one sold by American Cyanamid as POWDERLINK 1174 having the formula

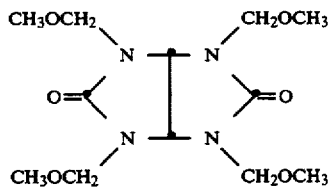

As noted above, the plasticizer of the invention should be designed with hydroxyl or carboxyl terminals depending on the crosslinker/resin combination to be employed.

Accordingly, the present invention provides a thermosetting powder coating composition comprising
(a) a semicrystalline polyester plasticizer, said plasticizer comprised of residues of linear diacids, linear diols, and optionally, of trifunctional branching agents,
wherein said diacids are of the formula $HOOC-(CH_2)_n-COOH$, wherein n is an integer from 2 to 20, wherein said diols are of the formula $HO-(CH_2)_n-OH$, wherein n is an integer from 2 to 20, and wherein said branching agent is selected from the group consisting of residues of trimethylolpropane, glycerol, and trimellitic acid;
wherein said plasticizer has a melting point of from about 40° C. to 200° C., a heat of fusion of from about 12 to 50 cal./g., an ICI melt viscosity of from about 0.5 to 20 poise, and an acid or hydroxyl number of about 20 to 120;
(b) an amorphous curable polyester; and
(c) a crosslinking effective amount of a crosslinking agent.

As a further aspect of the present invention, there is provided the above semicrystalline polyester plasticizer, which is useful in thermosetting powder coating compositions.

As an especially preferred embodiment of this aspect of the present invention there is provided a semicrystalline polyester plasticizer, said plasticizer comprised of residues of linear diacids, linear diols, and optionally, of trifunctional branching agents,
wherein said diacids are of the formula $HOOC-(CH_2)_n-COOH$, wherein n is an integer from 2 to 20, wherein said diols are of the formula $HO-(CH_2)_n-OH$, wherein n is an integer from 2 to 20, and wherein said branching agent is selected from the group consisting of residues of trimethylolpropane, glycerol, and trimellitic acid;
wherein said plasticizer has a melting point of from about 40° C. to 200° C., a heat of fusion of from about 20 to 35 cal./g., an ICI melt viscosity of from about 1 to 5 poise, and an acid or hydroxyl number of about 30 to 80.

The amount of the plasticizer used in the formulation is dependent on characteristics of each polyester component, crossslinker, pigment loading, and end use of the desired coating. Such plasticizers do not reduce the storage stability of powder coating composition because they crystallize rapidly after the extrusion of the powder coating formulation. It plasticizes, because once melted during curing, it has a melt viscosity approximately 1/20 of typical polyesters used in powder coatings. It then crosslinks into the matrix after it serves its role as a plasticizer.

The amorphous polyester useful in the compositions of the present invention may be produced using well known polycondensation procedures. As used herein, the term "amorphous" refers to a polyester which exhibits no, or only a trace of, crystallization or melting point as determined by differential scanning calorimetry (DSC).

The preferred amorphous polyester component of the composition provided by this invention has a glass transition temperature (Tg) greater than 55° C., a hydroxyl number in the range of about 25 to 80, an acid number of not more than 15 and an inherent viscosity of about 0.15 to 0.4.

Another preferred curable amorphous polyester is one which has carboxy functional groups, for example, polyesters having a molecular weight of about 500 to about 5000, an acid number of about 25–80, a Tg greater than 55° C., and an inherent viscosity of about 0.15 to 0.4. Commercially available examples of such resins include ®RUCOTE 915, ®EMS 7612, ®EMS 7614, ®ALFTALAT AN 720, 721, 722, 744, 758, and ®ALFTALAT AN 9970 and 9983 resins available from Hoechst Celanese.

The amorphous polyester may be produced using well-known polycondensation procedures employing an excess of glycol to obtain a polymer having the specified hydroxyl number. The glycol residues of the amorphous polyester may be derived from a wide variety and number of aliphatic, alicyclic and alicyclic-aromatic glycols or diols containing from 2 to about 10 carbon atoms. Examples of such glycols include ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, 1,4-xylylenediol and the like.

The dicarboxylic acid residues of the amorphous polyester component may be derived from various aliphatic, alicyclic, aliphatic-alicyclic and aromatic dicarboxylic acids containing about 4 to 10 carbon atoms or ester-forming derivatives thereof such as dialkyl ester and/or anhydrides. Succinic, glutaric, adipic, azelaic, sebacic, fumaric, maleic, itaconic, 1,3- and 1,4-cyclohexanedicarboxylic, phthalic, isophthalic and terephthalic are representative of the dicarboxylic acids from which the diacid residues of the amorphous polyester may be derived. A minor amount, e.g., up to 10 mole percent, of the glycol and/or diacid residues may be replaced with branching agents, e.g., tri-functional residues derived from trimethylolethane, trimethylolpropane and trimellitic anhydride.

The preferred amorphous polyester component of the composition provided by this invention has a Tg greater than 55° C., a hydroxyl or acid number in the range of about 25 to 80, an inherent viscosity of about 0.15 to 0.4. The amorphous polyester component (b) preferably is comprised of (1) diacid residues of which at least 50 mole percent are terephthalic acid residues, (2) glycol residues of which at least 50 mole percent are derived from 2,2-dimethyl-1,3-propanediol (neopentyl glycol) and (3) up to 10 mole percent, based on the total moles of (2) and (3), of trimethylolpropane residues. These preferred amorphous polyesters are commercially available, e.g., under the names AZS 50 Resin, RUCOTE 107 and CARGILL Resin 3000, and/or can be prepared according to the procedures described in U.S. Pat. Nos. 3,296,211, 3,842,021, 4,124,570 and 4,264,751 incorporated herein by reference, and Published Japanese Patent Applications (Kokai) 73-05,895 and 73-26,292. The most preferred amorphous polyester consists essentially of terephthalic acid residues, 2,2-dimethyl-1,3-propanediol residues and up to 10 mole percent, based on the total moles of 2,2-dimethyl-1,3-propanediol residues, of trimethylolpropane residues, and possesses a Tg of about 50° to 65° C., a hydroxyl number of about 35 to 60, an acid number of less than 10 and an inherent viscosity of about 0.1 to 0.25.

The most readily-available, and thus the preferred, blocked polyisocyanate cross-linking agents or compounds are those commonly referred to as ε-caprolactam-blocked isophorone diisocyanate, e.g., those described in U.S. Pat. Nos. 3,822,240, 4,150,211 and 4,212,962, incorporated herein by reference. However, the products marketed as ε-caprolactam-blocked isophorone diisocyanate may consist primarily of the blocked, difunctional, monomeric isophorone diisocyanate, i.e., a mixture of the cis and trans isomers of 3-isocyanatomethyl-3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the ε-caprolactam-blocked, difunctional, monomeric isophorone diisocyanate and the ε-caprolactam-blocked, trifunctional trimer of isophorone diisocyanate. The reaction of the isocyanato groups with the blocking compound is reversible at elevated temperatures, e.g., normally about 150° C., and above, at which temperature the isocyanato groups are available to react with the hydroxyl groups present on the free hydroxy groups of the polyester to form urethane linkages.

Alternatively, the blocked isocyanate may be a cross-linking effective amount of an adduct of the 1,3-diazetidine-2,4-dione dimer of isophorone diisocyanate and a diol having the structure

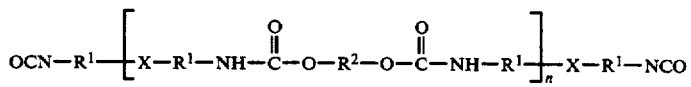

wherein
R¹ is a divalent 1-methylene-1,3,3-trimethyl-5-cyclohexyl radical, i.e., a radical having the structure

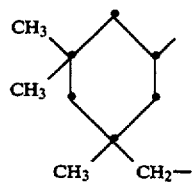

R² is a divalent aliphatic, cycloaliphatic, araliphatic or aromatic residue of a diol; and
X is a 1,3-diazetidine-2,4-dionediyl radical, i.e., a radical having the structure

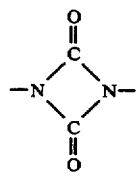

wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° to 130° C.

The adducts of the 1,3-diazetidine-2,4-dione dimer of isophorone diisocyanate and a diol are prepared according to the procedures described in U.S. Pat. No. 4,413,079, incorporated herein by reference, by reacting the diazetidine dimer of isophorone diisocyanate, preferably free of isocyanurate trimers of isophorone diisocyanate, with diols in a ratio of reactants which gives as isocyanto:hydroxyl ratio of about 1:0.5 to 1:0.9, preferably 1:0.6 to 1:0.8. The adduct preferably has a molecular weight of 1450 to 2800 and a melting point of about 85° to 120° C. The preferred diol reactant is 1,4-butanediol. Such an adduct is commercially available under the name Hüls BF1540.

The amount of the blocked diisocyanate cross-linking compound present in the compositions of this invention can be varied depending on several factors such as those mentioned hereinabove relative to the amount of components (a) and (b) which are utilized. Typically, the amount of cross-linking compound which will effectively cross-link the polymers to produce coatings having a good combination of properties is in the range of about 5 to 30 weight percent, preferably 15 to 25 weight percent, based on the total weight of components (a) and (b).

Other crosslinking agents for use with the above plasticizer include the epoxy resins. Preferred epoxy functional resins generally have a molecular weight of about 300 to about 4000, and have approximately 0.05 to about 0.99, epoxy groups per 100g of resin (i.e., 100-2000 weight per epoxy (WPE)). Such resins are widely known and are commercially-available under the EPON ® trademark of the Shell Chemical Company, the ARALDITE ® tradename of CIBA-Geigy, and D.E.R. resins of the Dow Chemical Company.

The powder coating compositions of this invention may be prepared from the compositions described herein by dry-mixing and then melt-blending components (a) and (b), and (c), and preferably along with a cross-linking catalyst, along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a Brabender extruder at 90° to 130° C., granulated and finally ground. The melt blending should be carried out at a temperature sufficiently low to prevent the unblocking of the polyisocyanate cross-linking compound and thus avoiding premature cross-linking.

Typical of the additives which may be present in the powder coating compositions include benzoin, flow aids or flow control agents which aid the formation of a smooth, glossy surface, stabilizers, pigments and dyes.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., MODAFLOW from Monsanto Company and ACRONAL from BASF. Other flow control agents which may be used include MODAREZ MFP available from Synthron, EX 486 available from Troy Chemical, BYK 360P available from BYK Mallinkrodt and PERENOL F-30-P available from Henkel. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present may preferably be in the range of about 0.5 to 4.0 weight percent, based on the total weight of the resin component, and the cross-linking agent.

The powder coating compositions may be deposited on various metallic and non-metallic (e.g., thermoplastic or thermoset composite) substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also effects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coatings of 25 to 120 microns thickness may be obtained.

Another method of applying the powder coating compositions is the electrostatic fluidized bed process which is a combination of the two methods described above. For example, annular or partially annular electrodes are mounted in the air feed to a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistance materials such as glass, ceramic and various metal materials. The compositions are especially useful for producing coatings on articles constructed of metals and metal alloys, particularly steel articles. Thus, as a further aspect of the present invention there is provided a shaped or formed article coated with the cured thermosetting powder coating composition of the present invention as illustrated herein.

Further examples of formulation methods, additives, and methods of powder coating application may be found in *User's Guide to Powder Coating*, 2nd Ed., Emery Miller, editor, Society of Manufacturing Engineers, Dearborn, (1987).

Experimental Section

The inherent viscosity (I.V.), in dl/g are determined in phenol/tetrachloroethane (60/40 w/w) at a concentration of 0.5 g/100 ml. The resin melt viscosity, in poise, are determined using an ICI melt viscometer at 200° C. The acid number and hydroxyl number are determined by titration and reported as mg of KOH consumed for each gram of resin. The glass transition temperature (Tg), crystallization temperature on heating (Tch) and melting temperatures (Tm) are determined by differential scanning calorimetry (DSC) on the second heating cycle at a scanning rate of 20° C./minute after the sample has been heated to melt and quenched to below the resin Tg. Tg values are reported as midpoint and Tch and Tm at peaks and valleys of transitions. The weight average molecular weight (Mw) and number average molecular weight (Mn) are determined by gel permeation chromatography in tetrahydrofuran (THF) using polystyrene standard and a UV detector. Impact strengths are determined using a Gardner Laboratory,Inc., impact tester per ASTM D 2794-84. Pencil hardness is determined using ASTM D 3363-74. The hardness is reported as the hardest pencil which will not cut into the coating. The results are expressed according to the following scale: (softest) 6B,5B,4B,3B,2B,B,HB,F,H,2H,3H,4H,5H,6H (hardest). The conical mandrel is performed using a Gardener Laboratory Inc., conical mandrel of specified size according to ASTM-522. The 20 and 60 degree gloss are measured using a gloss meter (Gardener Laboratory, Inc. Model GC-9095) according to ASTM D-523. The flexibility of coating is tested by bending panel back with panels inserted between the two halves and pressurized with hydraulic jack to 10,000 psi. The coating capable of bending without cracks or popping with the least numbers of panels (X) in between the bent is called to have passed XT bend.

A. Resin preparation

1. Carboxyl-functional polyester of 1,12-dodecanedioic acid and 1,6-hexandiol

To a 1000 mL, 3-neck flask was added 1,6-hexanediol (201.7 g, 1.707 moles). The content was heated to melt. 1,12-dodecanedioic acid ( 353.6 g, 1.535 moles), and butanestannoic acid (FASCAT 4100, 0.5 g) were then added. The flask was swept with 1.0 scfh nitrogen and heated from 180° to 230° C. over 6 hours. The batch was maintained at 230° C. untill resin acid number was below 5 mg KOH/g resin. The 1,12-dodecanedioic acid (79 g) was added and the reaction maintained at 230° C. until the acid number reached 25–45. The molten resin was then poured to a syrup can where it cooled to a white solid with the following properties:

| I.V. | 0.290 dl/g |
| --- | --- |
| ICI Melt Viscosity at 200° C. | 1.5 poise |
| Acid Number | 44 |
| DSC (2nd cycle) | |
| Tm 73° C. with heat of fusion 30.5 cal/g | |
| Gel Permeation Chromatography: | |
| Mw | 11459 |
| Mn | 3450 |

2. Hydroxyl-functional copolyester of 1,12-dodecanedioic acid and 1,6-hexandiol and trimethylol-propane To a 1000 mL, 3-neck flask were added 1,6-hexanediol (227.9 g, 1.928 moles) and trimethylol-propane (13.6 g, 0.101 mole). The contents were heated to melt. 1,12-dodecanedioic acid (428.0 g, 1.845 moles), and butanestannoic acid (FASCAT 4100, 0.6 g) were added. The flask was swept with 1.0 scfh nitrogen and heated from 180° to 230° C. over 6 hours. The batch was maintained at 230° C. until resin acid number was below 5 mg KOH/g resin. The molten resin was poured to a syrup can where it cooled to a white solid with the following properties:

| I.V. | 0.355 dl/g |
| --- | --- |
| ICI Melt Viscosity at 200° C. | 3.9 poise |
| Hydroxyl Number | 22 |
| DSC (2nd cycle) | |
| Tm 72° C. with heat of fusion 28.0 cal/g | |
| Gel Permeation Chromatography: | |
| Mw | 27802 |
| Mn | 6916 |

B. Powder coating formulation Example 1

Powder coating based on amorphous polyester/Primid XL552 and plasticizer 1. and 60 pph $TiO_2$ Amorphous resin, RUCOTE 915 (737 g), carboxyl plasticizer 1. ( 23 g), PRIMID XL552 (40 g), benzoin (2g), flow control agent (8.0 g) and titanium dioxide (480 g) were mixed in a Henschel mixer for 15–30 seconds and compounded in a ZSK 30 twin screw extruder. The extruder temperature profile was zone 1=120° C., zone 2=120° C., a screw speed of 400 rpm and a feed rate to achieve a 27% torque. The extrudate was collected and allowed to cool. The product was granulated and pulverized using a Bantam mill with liquid nitrogen bled into the grinding chamber. The powder was classified through a 200 mesh screen. The powder was electro-statically applied to 3 in.×9 in. metal panels and cured in a 325° F. oven for 20 minutes. The film properties were as follows:

| Film thickness, Mil | 2.2 |
| --- | --- |
| Impact Strength (in.-lb) | |
| Front | >160 |
| Reverse | >160 |
| Pencil Hardness | H |
| ⅛ in. Conical Mandrel | Pass |
| Gloss | |
| 20 | 93 |
| 60 | 96 |
| T Bend | 1T |
| Appearance: Excellent, smooth and little orange peel | |

EXAMPLE 2

Powder coating based on amorphous polyester/PRIMID XL552 and plasticizer 1. with 70 pph $TiO_2$ Amorphous resin, RUCOTE 915 (737 g), carboxyl polyester 1. ( 23 g), PRIMID XL552 (40 g), benzoin (2 g), flow control agent (8.0 g) and titanium dioxide (560 g) were mixed in a Henschel mixer for 15–30 seconds and compounded in a ZSK 30 twin screw extruder. The extruder temperature profile was zone 1 = 120° C., zone 2 = 120° C., a screw speed of 400 rpm and a feed rate to achieve a 27% torque. The extrudate was collected and allowed to cool. The product was granulated and pulverized using a Bantam mill with liquid nitrogen bled into the grinding chamber. The powder was classified through a 200 mesh screen. The powder was electrostatically applied to 3 in. ×9 in. metal panels and cured in a 325° F. oven for 20 minutes. The film properties were as follows:

| Film thickness, Mil | 1.8 |
|---|---|
| Impact Strength (in.-lb) | |
| Front | >160 |
| Reverse | >160 |
| Pencil Hardness | H |
| ⅛ in. Conical Mandrel | Pass |
| Gloss | |
| 20 | 97 |
| 60 | 97 |
| T Bend | 2T |
| Appearance: Excellent, smooth and little orange peel | |

EXAMPLE 3

Powder coating based on polyester/Huls BF1540 and plasticizer 2 with 40 pph TiO2

This example illustrates the low temperature (350° F.) required to cure the films to more than 200 MEK double rubs.

Polyester resin Hoechst AN739 (504 g), internally blocked isophorone diisocyanate Huls BF1540 (140 g), plasticizer 2 (56.0 g), dibutyltin dilaurate (7.0 g), benzoin (7 g), and flow control agent (7.0 g) and titanium dioxide (280 g) were mixed in a Henschel mixer and compounded in a ZSK 30 extruder. The extruder temperature profile was feed zone 135° C., die zone 135° C., and a screw speed of 400 rpm. The extrudate was cooled through a chill roll, granulated and pulverized using a Bantam mill with liquid nitrogen bled into the grinding chamber. The powder was classified through a 200 mesh screen. The powder was electrostatically applied to 3 in. ×9 in. metal panels and cured in a 350° F. oven for 20 minutes. The film properties were as follows:

| Film thickness, Mil | 2.0 |
|---|---|
| Impact Strength (in.-lb) | |
| Front | >160 |
| Reverse | >160 |
| Pencil Hardness | 2H |
| ⅛ in. Conical Mandrel | Pass |
| Gloss | |
| 20 | 82 |
| 60 | 92 |
| Methyl Ethyl ketone double rubs | 200+ |
| T Bend | 2T |
| Methyl Ethyl Ketone double rubs to bare metal | 1520 |

EXAMPLE 4

Powder coating based on polyester/Huls BF1540 and plasticizer 2 with 40 pph TiO2

This example illustrates the low temperature (350° F.) required to cure the films to more than 200 MEK rubs for powder coating based on Huls BF1540.

Polyester resin Hoechst AN739 (532 g), internally blocked isophorone diisocyanate Huls BF1540 (140 g), plasticizer 2 (28.0 g), dibutyltin dilaurate (7.0 g), benzoin (7.0 g), flow control agent (7.0 g) and titanium dioxide (280 g) were mixed in a Henschel mixer and compounded in a ZSK 30 extruder. The extruder temperature profile was feed zone 135° C., die zone 135° C., and a screw speed of 400 rpm. The extrudate was cooled through a chill roll, granulated and pulverized using a Bantam mill with liquid nitrogen bled into the grinding chamber. The powder was classified through a mesh screen. The powder was electrostatically applied to 3 in. ×9 in. metal panels and cured in a 350° F. oven for 20 minutes. The film properties were as follows:

| Film thickness, Mil | 2.0 |
|---|---|
| Impact Strength (in.-lb) | |
| Front | >160 |
| Reverse | >160 |
| Pencil Hardness | H |
| ⅛ in. Conical Mandrel | Pass |
| Gloss | |
| 20 | 86 |
| 60 | 95 |
| Methyl Ethyl ketone double rubs | 200+ |
| T Bend | 3T |
| Methyl Ethyl Ketone double rubs necessary to reveal bare metal | 1050 |

C. Comparative Examples

Comparative Example 1

Polyester/Primid XL552

Amorphous resin, RUCOTE 915 (379 g), PRIMID XL552 (21 g), benzoin (2.0 g), and flow control agent (6.0 g) and titanium dioxide (200 g) were mixed in a Vitamix and compounded in an APV 2015 twin screw extruder with a set temperature profile of 130° C., a screw speed of 250 rpm and a feed rate to achieve a 52% torque. The extrudate was collected and allowed to cool. The product was granulated and pulverized using a Bantam mill with liquid nitrogen bled into the grinding chamber. The powder was classified through a 200 mesh screen. The powder was electrostatically applied to 3 in. ×9 in. metal panels and cured in a 325° F. oven for 20 minutes. The film properties were as follows:

| Film thickness, Mil | 3.0 |
|---|---|
| Impact Strength (in.-lb) | |
| Front | >160 |
| Reverse | >160 |
| Pencil Hardness | F |
| ⅛ in. Conical Mandrel | Pass |
| Gloss | |
| 20 | 79 |
| 60 | 94 |
| T Bend | 3T |
| Appearance: Fair but with significant orange peel relative to other examples. | |

Comparative Example 2

Amorphous polyester/Primid XL552

Amorphous resin, EMS GRILESTA V76-12 (379 g), PRIMID XL552 (21 g), benzoin (1.0 g), and flow control agent (4.0 g) and titanium dioxide (200 g) were mixed in a Vitamix and compounded in an APV 2015 twin screw extruder with a set temperature profile of 130° C., a screw speed of 250 rpm and a feed rate to achieve a 69% torque. The extrudate was collected and allowed to cool. The product was granulated and pulverized using a Bantam mill with liquid nitrogen bled into the grinding chamber. The powder was classified through a 200 mesh screen. The powder was electrostatically applied to 3 in. ×9 in. metal panels and cured in a 325° F. oven for 20 minutes. The film properties were as follows:

| Film thickness, Mil | 2.0 |
|---|---|
| Impact Strength (in.-lb) | |
| Front | >160 |
| Reverse | >160 |
| Pencil Hardness | F |
| ⅛ in. Conical Mandrel | Pass |
| Gloss | |
| 20 | 69 |
| 60 | 72 |
| T Bend | 2T |
| Appearance Fair but with significant orange peel relative to other examples. | |

Comparative Example 3

Powder coating based on polyester/Huls BF1540 with 40 pph TiO2

This example illustrates that 350° F. is not sufficient to cure the coating system based on Huls BF1540.

Polyester resin Hoechst AN739 (560 g), internally blocked isophorone diisocyanate Huls BF1540 (140 g), dibutyltin dilaurate (7.0 g), benzoin (7.0 g), flow control agent (7.0 g) and titanium dioxide (280 g) were mixed in a Henschel mixer and compounded in a ZSK 30 extruder. The extruder temperature profile was Feed zone 135° C., die zone 135° C., and a screw speed of 400 rpm. The extrudate was cooled through a chill roll, granulated and pulverized using a Bantam mill with liquid nitrogen bled into the grinding chamber. The powder was classified through a 200 mesh screen. The powder was electrostatically applied to 3 in. ×9 in. metal panels and cured in a 350° F. oven for 20 minutes. The film properties were as follows:

| Film thickness, Mil | 2.0 |
|---|---|
| Impact Strength (in.-lb) | |
| Front | 40 |
| Reverse | >20 |
| Pencil Hardness | H |
| ⅛ in. Conical Mandrel | Pass |
| Gloss | |
| 20 | 87 |
| 60 | 95 |
| Methyl Ethyl ketone double rubs | 200 |
| T Bend | more than 6T |
| Methyl Ethyl Ketone double rubs to bare metal | 460 |

Comparative Example 4

Powder coating based on polyester/Huls BF1540 with 40 pph TiO2

This example illustrates that even at cure temperature of 375° F., coating properties are not good enough. The powder does not cure to a full impact strength of 160/160 (front/reverse) and that MEK rub resistance is much less than what example 2 and 3 accomplished at 350° F. cure temperature.

The same powder coating as described in comparative example 3 was sprayed and cured at 375° F. for 20 minutes. The coating properties was as followed.

| Film thickness, Mil | 1.9 |
|---|---|
| Impact Strength (in.-lb) | |
| Front | 80 |
| Reverse | 20 |
| Pencil Hardness | H |
| ⅛ in. Conical Mandrel | Pass |
| Gloss | |
| 20 | 85 |
| 60 | 93 |
| Methyl Ethyl ketone double rubs | 200 |
| T Bend | more than 6T |
| Methyl Ethyl Ketone double rubs reveal bare metal | 390 |

I claim:

1. A semicrystalline polyester plasticizer, said plasticizer consisting essentially of residues of linear diacids and linear diols,
   wherein said diacids are comprised of at least 90 weight percent of 1,12-dodecanedioic acid,
   wherein said diols are comprised of at least 90 weight percent of residues of 1,6-hexanediol,
   wherein said plasticizer has a melting point of from about 60° C. to 150° C., a heat of fusion of from about 20 to 35 cal./g., an ICI melt viscosity of from about 1 to 5 poise, and an acid or hydroxyl number of about 30 to 80.

2. The plasticizer of claim 1, wherein the acid number is 30 to 80.

3. The plasticizer of claim 1, wherein the hydroxyl number is 30 to 80.

* * * * *